United States Patent
Guha et al.

(10) Patent No.: US 9,676,942 B2
(45) Date of Patent: Jun. 13, 2017

(54) ENHANCED THERMOSET RESINS CONTAINING PRE-TREATED NATURAL ORIGIN CELLOLOSIC FILLERS

(75) Inventors: Probir Kumar Guha, Troy, MI (US); Michael J. Siwajek, Rochester Hills, MI (US); Michael Joseph Hiltunen, Westland, MI (US); Scott Eldor Pflughoeft, Auburn, IN (US); Swati Neogi, East Brunswick, NJ (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 269 days.

(21) Appl. No.: 14/233,870

(22) PCT Filed: Jul. 19, 2012

(86) PCT No.: PCT/US2012/047262
§ 371 (c)(1),
(2), (4) Date: Jul. 7, 2014

(87) PCT Pub. No.: WO2013/012964
PCT Pub. Date: Jan. 24, 2013

(65) Prior Publication Data
US 2014/0329964 A1    Nov. 6, 2014

Related U.S. Application Data

(60) Provisional application No. 61/509,375, filed on Jul. 19, 2011.

(51) Int. Cl.
| | | |
|---|---|---|
| *C08L 101/00* | (2006.01) | |
| *C08L 75/04* | (2006.01) | |
| *C08J 5/24* | (2006.01) | |
| *C08K 7/02* | (2006.01) | |
| *C08K 9/04* | (2006.01) | |
| *C08H 8/00* | (2010.01) | |
| *C08L 67/06* | (2006.01) | |
| *C08L 97/02* | (2006.01) | |
| *C08G 18/64* | (2006.01) | |
| *C08G 18/76* | (2006.01) | |

(52) U.S. Cl.
CPC ........ *C08L 101/00* (2013.01); *C08G 18/6492* (2013.01); *C08G 18/7664* (2013.01); *C08H 8/00* (2013.01); *C08J 5/24* (2013.01); *C08K 7/02* (2013.01); *C08K 9/04* (2013.01); *C08L 67/06* (2013.01); *C08L 75/04* (2013.01); *C08L 97/02* (2013.01); *C08L 2205/05* (2013.01)

(58) Field of Classification Search
None
See application file for complete search history.

(56) References Cited

U.S. PATENT DOCUMENTS

| | | |
|---|---|---|
| 3,493,424 A | 2/1970 | Mohrlok et al. |
| 4,260,538 A | 4/1981 | Iseler et al. |
| 4,643,126 A | 2/1987 | Wilkinson et al. |
| 4,781,844 A | 11/1988 | Kortmann et al. |
| 5,073,442 A | 12/1991 | Knowlton |
| 5,100,935 A | 3/1992 | Iseler et al. |
| 5,268,400 A | 12/1993 | Iseler et al. |
| 5,854,317 A | 12/1998 | Rinz |
| 6,780,923 B2 | 8/2004 | Guha et al. |
| 7,655,297 B2 | 2/2010 | Guha et al. |
| 2003/0046772 A1* | 3/2003 | Halahmi ............... C08J 5/06 8/115.51 |
| 2009/0054552 A1 | 2/2009 | Yano et al. |
| 2010/0272980 A1 | 10/2010 | Kowata et al. |

OTHER PUBLICATIONS

Emil Fischer and Arthur Speier, English Translation of Summary of the article "Berichte der deutschen chemischen Gesellschaft" vol. 28, Issue 3, pp. 3252-3258, dated Oct.-Dec. 1895.
Extended European search report dated May 7, 2015 for Application No. PCT/US2012/047262.

* cited by examiner

*Primary Examiner* — Ana Woodward
(74) *Attorney, Agent, or Firm* — Avery N. Goldstein; Blue Filament Law PLLC

(57) ABSTRACT

A process of formulating a curable thermoset resin formulation is provided that includes reacting a natural cellulosic filler with at least one of: a silsesquioxane, a isocyanate, a base, or an organic acid to form a reduced hydrophilicity filler. By intermixing the resulting reduced hydrophilicity filler with a thermoset cross linkable polymeric resin, a curable thermoset resin formulation is formed that has superior properties to conventional formulations in terms of density and environmental impact. The formulation properties in terms of strength of the cured article are improved relative to untreated natural fillers. The treatment is advantageous relative to plasma treatment. An article is also provided produced upon cure of the formulation.

10 Claims, 1 Drawing Sheet

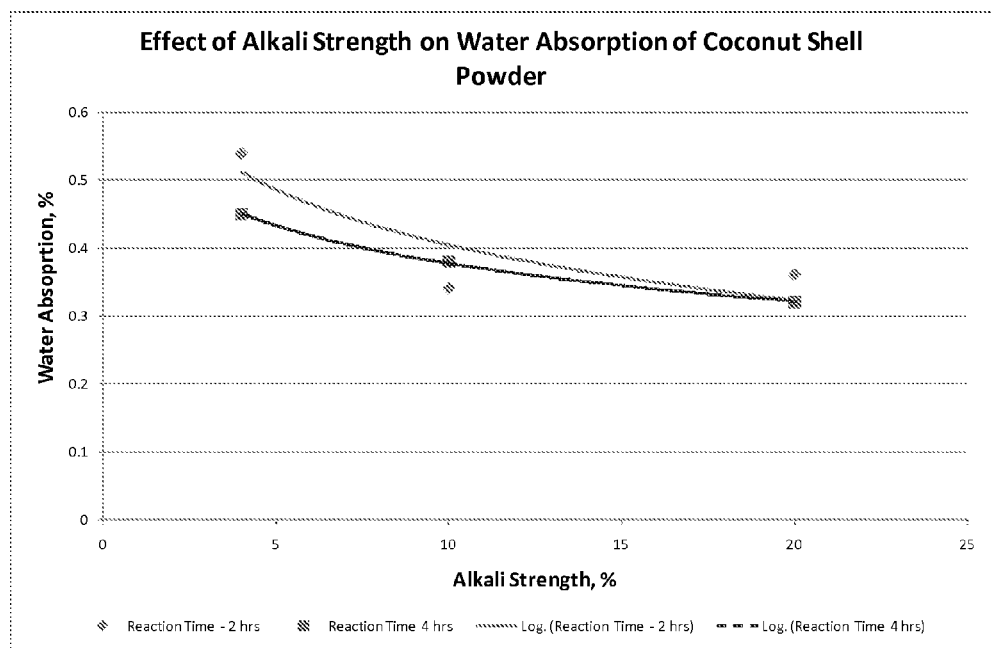

ENHANCED THERMOSET RESINS CONTAINING PRE-TREATED NATURAL ORIGIN CELLOLOSIC FILLERS

CROSS REFERENCE TO RELATED APPLICATIONS

This application claims priority benefit of U.S. Provisional Application Ser. No. 61/509,375 filed 19 Jul. 2011; the contents of which are hereby incorporated by reference.

FIELD OF INVENTION

The present invention in general relates to thermoset resins curable to form articles and in particular to such resins containing natural origin cellulosic fillers that have been pretreated to enhance interaction with a surrounding resin matrix.

BACKGROUND OF THE INVENTION

A fiber filler is typically added to a thermoset resin such as those used in sheet molding compounds (SMC) or bulk molding compounds (BMC) in order to provide a variety of adjustable properties for the resulting article. Fillers are routinely added to reduce article cost, modify viscosity of pre-cured loaded resins, control article shrinkage, control surface finish, density, flammability, electrical conductivity, chemical resistance, and strength of the resulting thermoset formulation. Particulate fillers typically account for amounts ranging from 0-80 total weight percent with typical particle filler sizes ranging from 0.1 to 50 microns. In addition to particulate fillers, fiber fillers are typically present in a thermoset resin formulation to provide enhanced strength to the resulting article relative to particulate filler. Fiber fillers have traditionally included glass, carbon, polyimides, polyesters, polyamides, and natural fibers such as cotton, silk, and hemp.

There is a growing appreciation that thermoset materials containing high density particulate fillers are difficult to recycle and pose added health risks when ground to a powder. While considerable effort has been expended to produce high performance SMC and BMC materials containing natural fibers, such efforts have met with limited success owing to poor interfacial interaction between natural fibers and the surrounding cured hydrophobic thermoset matrices. While progress has been made in the area of plasma pretreatment of natural materials, these efforts are complicated and largely focused on fibrous natural materials.

Thus, there exists a need for thermoset resin formulations containing pre-treated natural origin cellulosic fillers, especially particulate fillers.

SUMMARY OF THE INVENTION

A process of formulating a curable thermoset resin formulation is provided that includes reacting a natural cellulosic filler with at least one of: a silsesquioxane, a isocyanate, a base, or an organic acid to form a reduced hydrophilicity filler. By intermixing the resulting reduced hydrophilicity filler with a thermoset cross linkable polymeric resin, a curable thermoset resin formulation is formed that has superior properties to conventional formulations in terms of density and environmental impact. The formulation properties in terms of strength of the cured article are improved relative to untreated natural fillers. The treatment is advantageous relative to plasma treatment. An article is also provided produced upon cure of the formulation.

BRIEF DESCRIPTION OF THE DRAWINGS

FIG. 1 is a plot of percent water absorption by powdered coconut husk as a function of solution percent NaOH.

DESCRIPTION OF THE PREFERRED EMBODIMENTS

The present invention has utility as a thermoset resin composition that upon cure forms a variety of molded articles. Such articles are used in a variety of applications such as vehicle components such as bed lines, body components, trim, interior components, and undercar components; architectural components such as trim and doors, marine components such as hulls, trim, and cockpit pieces; and the like. The present invention pre-treats natural cellulosic fillers to reduce hydrophilic behavior of the natural cellulosic fillers thereby rendering such fillers more compatible with the generally hydrophobic monomers and oligomers that are used in thermoset formulations that upon cure form SMC or BMC articles. Through reducing the hydrophilic nature of natural cellulosic fillers, the environmental burden of producing such articles is reduced while the properties of the resultant article relative to identically formed articles save for the pre-treatment of the natural cellulosic fillers is improved. Density decreases through inclusion of inventive fillers are greater than 0.1 units of density and in some embodiments between 0.1 and 0.4 units based on replacement of higher density inorganic fillers. As a result, articles are readily formed with a density of between 1.1 and 1.5, where density is in units of grams per cubic centimeter. According to the present invention, the hydrophilic nature of natural cellulosic fillers is reduced through pretreatment with a silsesquioxane (SQ), an isocyanate, treatment with an organic acid or a base, or combinations thereof.

Typically, isocyanate moieties are contacted with natural cellulosic fillers prior to mixing the natural cellulosic fillers into a thermoset resin formulation under dry conditions to inhibit isocyanate hydrolysis through reaction with water. Typical molar stoichiometric ratios between isocyanate moieties introduced and hydroxyl moieties (—CNO:—OH) present in the natural cellulosic filler have a ratio that are between 0.000005-0.2:1. More preferably, the ratio of isocyanate moieties to hydroxyl moieties associated with a natural filler of between 0.1-1.5:1 equivalent ratio.

In another embodiment of the present invention, natural cellulosic fillers are treated with solutions of hydroxides or organic acids and are observed to improve the properties of the resultant SMC or BMC articles. Organic acids operative herein include:

$$R\text{—}COOX \qquad (I)$$

where R is $C_1$-$C_{24}$ alkyl, $C_1$-$C_{24}$ alkenyl, $C_6$-$C_{24}$ aryl, a substituent modified forms of any of the aforementioned where a substitute is $C_1$-$C_{12}$ alkyl, a primary amine, a $C_1$-$C_6$ alkyl secondary amine, or a $(C_1$-$C_6)_2$ alkyl tertiary amine, the substituent replacing an aliphatic proton, and X is H, or an alkali metal ion such as Na+ or K+.

The acid according to formula I or a polycarboxylic acid, such as acrylic, or polyacrylic acid; are combined with the natural cellulosic fillers under conditions to induce esterification between hydroxyl groups associated with the cellulosic filler and the carboxylic acid moieties. Such conditions illustratively include introducing an acid of formula I or a polycarboxylic acid under acidic conditions to the natural cellulosic fillers for a sufficient amount of time for esterification to occur. Typical ratios of carboxyl moieties relative to cellulosic hydroxyl moieties range from 0.1-1.5:1 equivalent ratio and preferable are from 0.85-1.05:1 equivalent ratio to sufficiently reduce the hydrophilic nature of the natural cellulosic fillers. Esterification reaction conditions are well known to the art and illustratively include the classic Fischer esterification reaction and later variants, *Chemische Berichte* 28: 3252-3258.

The reaction of basic hydroxide compounds with natural cellulosic filler is noted to reduce the water absorption of the treated fillers. As a result of lower water content, undesired reactions of SMC and BMC resins with moisture instead of forming crosslinkages are reduced. Exposing the particulate fillers to basic solution with a pH above 8.2 and subsequently drying the particulate fillers is sufficient to improve the properties of the resultant SMC or BMC article. It is appreciated that base dissolved in alcohols achieves a pH in excess of 14, the maximal reaction equilibrium shift in water dissociation, and that treatment is pH solutions above 14 and even above 20 makes the process of particulate filler treatment both fast and facilitates drying of the particulate fillers of residual water and post-treatment, compared to aqueous base solutions. Alcohols suitable for dissolution of bases illustratively include methanol, ethanol, and isopropanol.

An alternative process for reducing the hydrophilic nature of natural cellulosic filler according to the present invention includes exposing the filler to a monomeric isocyanate or a polyisocyanate. Preferably, the natural cellulosic filler is pre-dried through conventional techniques prior to exposure to the isocyanate. Without intending to be bound to a particular theory, it is believed that the isocyanate reacts with hydroxyl functionality associated with sugar moieties forming the cellulose of the filler thereby forming a urethane linkage and having a pendant group extending from the isocyanate that is invariably hydrophobic in nature. The pendant group promotes interfacial interaction with thermoset resin precursors and subsequent cured resin formed therefrom.

An isocyanate operative in the present invention illustratively includes hexamethylene-1-isocyanate, 2,2,4-trimethylhexamethylene-1-isocyanate; alicyclic isocyanates such as cyclohexane isocyanate, dicyclohexylmethane-4-isocyanate, aryl isocyanates such as toluene-2-isocyanate, naphthylene-1-isocyanate; polyisocyanates such as aliphatic polyisocyanates such as hexamethylene-1,6-diisocyanate, 2,2,4-trimethylhexamethylene-1,6-diisocyanate; alicyclic polyisocyanates such as cyclohexane-1,4-diisocyanate, dicyclohexylmethane-4,4'-diisocyanate, aryl polyisocyanates such as p-phenylene diisocyanate, toluene-2,4-isocyanate, and diphenyl methane 2,4'-diisocyanate. Additionally, an isocyanate operative herein includes polyphenylene polymethylene polyisocyanate derived from condensation of aniline and formalin, liquefied diphenylmethane diisocyanates containing carbodiimide groups or uretonimine groups, modified polyisocyanates containing at least one urethane group, allophanate group, biuret group or uretodione group. Particularly preferred isocyanates are modified polyisocyanates containing urethane groups, allophanate groups or uretodione groups such that the polyisocyanates are liquid at the ambient temperature such as 20 degrees Celsius.

The silsesquioxane materials operative herein to treat a natural filler can be any of the types described in U.S. Pat. No. 4,781,844 (Kortmann, et al), U.S. Pat. No. 4,351,736 (Steinberger et al.), U.S. Pat. No. 5,073, 442 (Knowlton et al.) or U.S. Pat. No. 3,493,424 (Mohrlok et al.) each of which are incorporated herein by reference. These silsesquioxanes are of the formula R—Si(OR')$_3$ alone or together with silanes of the formula Si(OR')$_4$ wherein R represents a substituted or unsubstituted C$_{1-7}$ alkyl or alkenyl, with optional substituents of a halogen atom, amino, mercapto or epoxy substituents, and up to 95% of the R groups may be methyl moieties. R' represents a C$_{1-4}$ alkyl. Preferred silsesquioxanes are those that are neutral or anionic.

The silsesquioxanes may be prepared by adding silanes to a mixture of water, a buffer, a surface active agent and optionally an organic solvent, while agitating the mixture under acidic or basic conditions. It is preferable to add the quantity of silane uniformly and slowly in order to achieve a narrow particle size of 20 to 50 nanometers. The exact amount of silane which can be added depends on the substituent R and whether an anionic or cationic surface active agent is used.

Copolymers of the silsesquioxanes in which the units can be present in block or random distribution are formed by the simultaneous hydrolysis of the silanes. The preferred amount of silane of the formula Si(OR')$_4$ added is about 2 to 50 percent, relative to the total weight of the silanes employed, preferably 3 to 20 percent.

The following silanes are useful in preparing the silsesquioxanes of the present invention: methyltrimethoxysilane, methyltriethoxysilane, methyltriisopropoxyoxysilane, ethyltrimethoxysilane, ethyltriethoxysilane, propyltrimethoxysilane, isobutyltrimethoxysilane, isobutyltriethoxysilane, 2-ethylbutyltriethoxysilane, tetraethoxysilane, and 2-ethylbutoxytriethoxysilane.

These silsesquioxane is readily dissolved or dispersed in water in amounts ranging from 0.0001 to 3 total weight percent in water. The resulting aqueous composition of silsesquioxane is optionally acidified through the addition of an inorganic or organic acid. An acid, if present, preferably modifies the pH to a pH of less than 5 and preferably of less than 2. The silsesquioxane solution is readily applied to a conventional feedstock of natural cellulosic filler through conventional techniques such as spring the solution onto the filler or stirring the filler in the solution for a period of time to allow migration of the silsesquioxane to the filler surface followed by removal and drying prior to intermixing with thermoset resin formulation components.

Natural cellulosic fillers operative herein include a variety of plant based materials. These materials are typically characterized by low cost, local availability, renewable sources, and a lower density thann conventional fillers such as calcium carbonate and carbon black. Natural cellulosic fillers operative hereint illustratively include, hemp, cane, bamboo, jute, straw, silk, straw sawdust, nutshells, grain husks, grass, palm frond, coconut husk, coconut fiber and combinations thereof. Preferably, the use of a natural cellulosic filler, whether in strand or particle form, is pre-dried to a controlled moisture content, is cut and sized to a desired size distribution relative to the thermoset resin article that is to be formed. It is appreciated that filler with too large a particle size can negatively impact surface finish as well as physical properties of the resultant cured thermoset article. Typical loadings of natural cellulosic fillers in the form of particulate range from 0 to 80 weight percent with typical particulate sizes ranging from 0.1 to 150 microns. Typical fiber filler lengths range from 5 to 50 millimeters with fiber fillers typically also present from 0 to 80 total weight percent of the fully formulated thermoset resin formulation.

EXAMPLES

Example 1

The viscosity of a base SMC formulation having a specific gravity of 1.65 and containing 34 total weight percent glass is modified by the addition of a filler with a mean size of 50 microns in the amount detailed in Table 1. The modified formulations are subjected to viscosity measurement using a Brookfield LVT viscometer with a number 5 spindle operating at 20 revolutions per minute and a shear rate of 10/s. The viscosity measured are summarized in Table 1 in Centipoise×10$^{-4}$ upon mixing, 1 day- and 7 day-post mixing.

TABLE 1

Viscosity of various fillers at selected loadings.

| Shear Rate, 1/s | Time Elapsed after Paste Manufacturing | Filler | Filler Vol % | Initial Viscosity | Day 1 Viscosity | Day 7 Viscosity |
|---|---|---|---|---|---|---|
| 10 | 0 hr | Calcium Carbonate | 30 | 3.63 | 3.39 | 3.32 |
|  |  | Coconut Shell | 30 | 3.44 | 3.47 | 3.35 |
|  |  | Rice Husk | 30 | 5.35 | 6.65 | 34.95 |
|  |  | Walnut | 30 | 9.56 | 13.18 | 14.35 |
|  |  | Calcium Carbonate | 40 | 10.94 | 9.85 | 22.11 |
|  |  | Coconut Shell | 40 | 10.51 | 10.10 | 19.41 |
|  |  | Rice Husk | 40 | 15.98 | 21.60 | 44.90 |
|  |  | Walnut | 40 | 31.02 | 36.36 | 44.20 |
|  |  | Calcium Carbonate | 45 | 21.22 | 18.24 | 30.15 |
|  |  | Coconut Shell | 45 | 20.35 | 21.31 | 21.05 |
|  |  | Rice Husk | 45 | 32.50 | 32.20 | 46.00 |
|  |  | Walnut | 45 | 37.11 | 40.13 | 48.83 |

Example 2

A control of 50 micron mean diameter coconut shell powder is stirred overnight at 60 degrees Celsius in deionized water alone (control) or with 3% by solution weight acrylic acid having an approximate —COOH (acid): —OH (fiber) moiety molar ratio of 0.5:1.0. The powders are then removed from solutions and oven dried to less than 1% moisture by powder weight. The acid treated powder and the control powder are then separately formulated in a standard SMC formulation per Example 1. The percent of water absorption for the acid treated powder and control powder formulations are shown in Table 2 for six duplicate trials. Water absorption of the uncured SMC formulation is reduced by more than 54% compared to the control.

TABLE 2

Water absorption change through acid pre-treatment of cellulosic filler

| | Water absorption, % Resin "B" (Unsaturated PE) | | |
|---|---|---|---|
| Batch # | Actual | % Reduction | |
| Untreated | 1.91 | | |
| B1 | 0.875 | 54.19% | 6 batches of SMC Paste |
| B2 | 0.873 | 54.29% | Data with acid treated |
| B3 | 0.878 | 54.03% | Coconut Shell Powder |
| B4 | 0.874 | 54.24% | |
| B5 | 0.875 | 54.19% | |
| B6 | 0.85 | 55.50% | |

Example 3

The process of Example 2 is repeated with NaOH aqueous solutions of 4, 10, or 20 weight percent NaOH being used for reaction times of either 120 or 240 minutes being repeated in triplicate. The average percent water absorption for each condition is summarized in Table 3. The averaged percent water absorption for 120 and 240 minute reactions are plotted as a function of NaOH percent in FIG. 1. Similar results are obtained by treatment in isopropanol solutions.

TABLE 3

Alkali strength as percent NaOH effect on percent water absorption

| Alkali Strength, % | Reaction Time, minutes | % Water Absorption |
|---|---|---|
| 4 | 120 | 0.54 |
| 4 | 240 | 0.45 |
| 10 | 120 | 0.34 |
| 10 | 240 | 0.38 |
| 20 | 120 | 0.36 |
| 20 | 240 | 0.32 |

Example 4

Ten grams of dodecylbenzenesulfonic acid dissolved in a liter of deionized water is reacted with 200 grams of methyl trimethoxysilane for 24 hours at 60 degrees Celsius to achieve hydrolysis. The reaction product is neutralized ammonia hydroxide. The resultant silsesquioxane is stirred overnight at room temp with coconut shell powder with a mean particle size of 80 microns.

Then 3 samples are prepared as follows:

Sample #A—60 grams unsaturated polyester resin (65% solids, remaining styrene); 40 grams conventional low profile additive (40% solids level of poly(methyl methacrylate) (PMMA) dissolved in styrene); 2.6 grams tertiary butyl perbenzoate catalyst; 147 grams calcium carbonate filler; and 2 grams of magnesium oxide.

Sample #B—60 grams unsaturated polyester resin (65% solids, remaining styrene); 40 grams conventional low profile additive (40% solids level of PMMA dissolved in styrene); 2.6 grams tertiary butyl perbenzoate catalyst; 100 grams calcium carbonate filler; 20 grams untreated coconut shell powder; and 2 grams of magnesium oxide.

Sample #C—60 grams unsaturated polyester resin (65% solids, remaining styrene); 40 grams conventional low profile additive (40% solids level of PMMA dissolved in styrene); 2.6 grams tertiary butyl perbenzoate catalyst; 100 grams calcium carbonate filler ; 20 grams SQ treated coconut shell powder; and 2 grams of magnesium oxide.

The resultant water absorption of cure test specimens from the above 3 samples were as follows: Sample A (all Calcium Carbonate filler)—0.0083 grams per cc of cured test sample; Sample B (untreated Coconut Shell Powder and Calcium Carbonate filler)—0.0105 grams per cc of cured test sample; Sample C (SQ treated Coconut Shell Powder and Calcium Carbonate filler)—0.0087 grams per cc of cured test sample;

The test data showed that the SQ treated Coconut Shell Powder based product had 26.5% by volume less water absorption as the product based on the untreated coconut shell powder and 4.8% by volume higher water absorption than the sample with no coconut shell powder.

Water absorption of the uncured SMC formulation is reduced by more than 40% compared to the control.

Example 5

90 grams of coconut shell powder used in Example 1 is mixed with 75 grams of crude methylene di-isocyanate, Lupranate M20 and 25 grams of styrene. The dispersion is maintained at 150° F. for 12 hours and filtered and the residue from the filtration process is used in an SMC paste mix as follows:

|  | Sample D | Sample E |
|---|---|---|
| Soy Modified Unsaturated Polyester Resin | 60.00 | 60.00 |
| Reactive Monomer | 8.15 | 8.15 |
| Lo-Profile Additive A | 15.80 | 15.80 |
| Lo Profile Additive B | 15.80 | 15.80 |
| Catalyst | 2.70 | 2.70 |
| Zinc Stearate | 4.45 | 4.45 |
| M20 treated Coconut Filler | — | 20.00 |
| Calcium Carbonate | 197.71 | 145.00 |
| Magnesium Oxide | 1.20 | 1.20 |

Sample D (all Calcium Carbonate filler)—0.0082 grams per cc of cured test sample; Sample E (Lupranate M-20 treated Coconut Shell Powder and Calcium Carbonate filler)—0.0071 grams per cc of cured test sample; The Lupranate M20 treated coconut shell powder based formulation exhibited a 14% lower water absorption than the control formulation.

References recited herein are indicative of a level of skill in the art to which the invention pertains. These references are hereby incorporated by reference to the same extent as if each individual reference was explicitly and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process of formulating a curable thermoset resin formulation, comprising:
reacting a natural cellulosic filler with at least one of: a silsesquioxane, a di-isocyanate or a polyisocyanate, a base, or an organic acid to form a reduced hydrophilicity filler, said natural cellulosic filler being selected from the group consisting of: hemp, cane, bamboo, jute, straw, silk, straw sawdust, nutshells, grain husks, grass, palm frond, coconut husk, and coconut fiber; and
intermixing said reduced hydrophilicity filler with a thermoset cross linkable polymeric resin to form the curable thermoset resin formulation, wherein a molar stoichiometric ratio between isocyanate moieties of said di-isocyanate or said polyisocyanate introduced and hydroxyl moieties (—CNO:—OH) present in the natural cellulosic filler is between 0.000005-0.2:1.

2. The process of claim 1 wherein said filler is a particulate filler.

3. The process of claim 2 wherein said particulate filler has a mean size of between 0.1 and 150 microns.

4. The process of claim 1 wherein said filler is a fiber filler.

5. The process of claim 4 wherein said fiber filler has a mean fiber length of between 0.5 and 50 millimeters.

6. The process of claim 1 wherein said natural cellulosic filler is reacted with said organic acid and said organic acid is:

$$R\text{-COOX} \qquad (I)$$

where R is $C_1$-$C_{24}$ alkyl, $C_1$-$C_{24}$ alkenyl, $C_6$-$C_{24}$ aryl, a substituent modified form of any of the aforementioned where a substitute is $C_1$-$C_{12}$alkyl, a primary amine, a $C_1$-$C_6$ alkyl secondary amine, or a $(C_1$-$C_6)_2$ alkyl tertiary amine, the substituent replacing an aliphatic proton, and X is H, or an alkali metal ion of Na+ or K+.

7. The process of claim 1 wherein said natural cellulosic filler is reacted with said organic acid and said organic acid is a polycarboxylic acid.

8. The process of claim 1 further comprising drying said reduced hydrophilicity filler to a moisture content of less than 1 total weight percent of said reduced hydrophilicity filler.

9. The process of claim 1 further comprising the curing of said curable thermoset resin formulation.

10. The process of claim 1 further comprising adding at least one additive to said curable thermoset resin formulation, said at least one additive being a thermoplastic additive, an organic peroxide, a cure inhibitor, a mold release agent, a pigment, or a conventional filler.

* * * * *